No. 25,875. PATENTED OCT. 25, 1859.
J. W. BARCROFT.
DITCHING MACHINE.
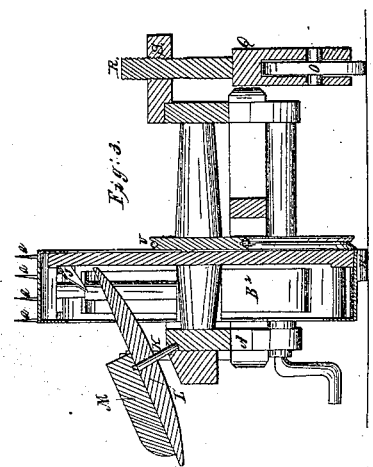
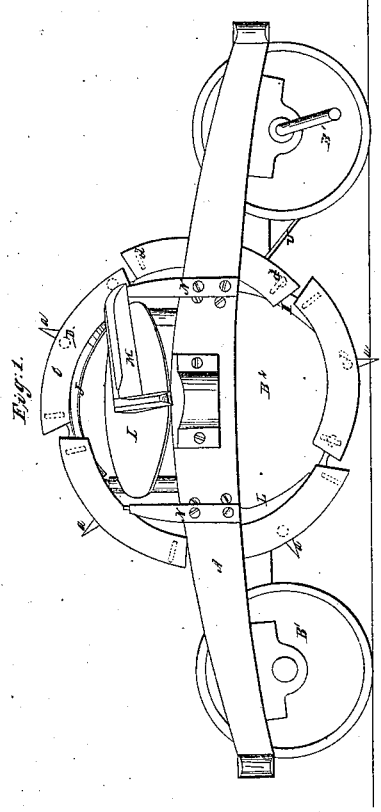
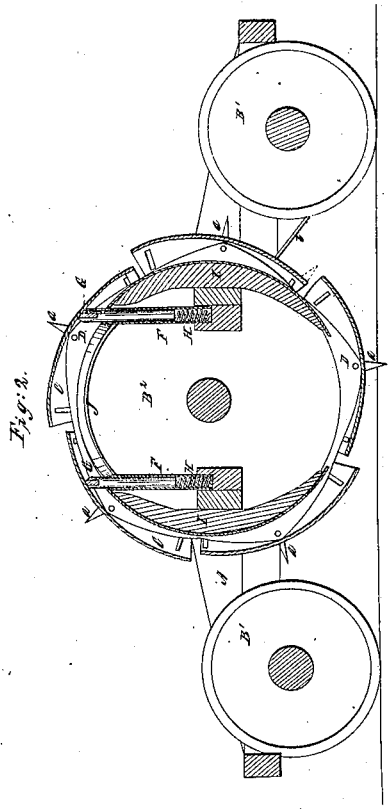
Witnesses:
Inventor

UNITED STATES PATENT OFFICE.

JOHN W. BARCROFT, OF FRIENDSHIP, VIRGINIA.

DITCHING-MACHINE.

Specification of Letters Patent No. 25,875, dated October 25, 1859.

*To all whom it may concern:*

Be it known that I, J. W. BARCROFT, of Friendship, in the county of Fairfax and State of Virginia, have invented a new and useful Improvement in Ditching-Machines; and I do hereby declare that the following is a full, clear, and exact description of the same, reference being had to the accompanying drawings, forming a part of the specification, in which—

Figure 1, represents a side view of the machine; Fig. 2, a longitudinal section; Fig. 3, a transverse section, and Fig. 4, a transverse section of one of the buckets or scoops.

Similar letters of reference in each of the several figures indicate corresponding parts.

The nature of my invention consists, 1st, in a combination of a revolving wheel with buckets or scoops set in a longitudinal form, with a stationary circular guard and an adjustable scraper, whereby the earth is scooped up and held between the inner circumference of the scoops and the outer circumference of the guard, until it arrives at the point of discharge and is then scraped off and deposited upon a turntable or inclined plane, as hereinafter described.

It consists, 2nd, in having the buckets or scoops hung on an axis at the center of their length and adjustable at both ends, whereby, in combination with an auxiliary guard and scraper, the machine can be adjusted to dig in its back, as well as forward movement.

It consists, 3rd, in providing sharp cutters projecting at right angles from the center of the scoop by which the earth and roots or grass to be taken out are completely severed from the bank of the ditch and the earth also loosened preparatory to being taken out by the succeeding scoop, in the manner hereinafter specified.

To enable others skilled in the art to make and use my invention, I will proceed to describe its construction and operation.

A, represents the framework within which are placed the wheels, B′ the driving wheels, and B² a pentangular wheel at the angles of which are attached the scoops C. These scoops are made of thin plate iron and the form, as will be seen, represent longitudinally a segment comprising one-fifth of a circle, and transversely three sides of an oblong figure. In the middle of the outside and near the outer edge, each scoop is fastened to an angle of the wheel by means of a screw D. Near to each end and upon the outside, is a slot in which is placed a screw $d$, by which the scoop is held at any desired angle, and may be adjusted so as to cut either with the back or forward movement of the machine.

Projecting from the middle of each scoop, on the outside, are four sharp cutters $a$; these may, if thought desirable, be placed near the end of the scoops, as shown in red in Fig. 2.

Attached to the inside of the frame, on each side of the shaft of the wheel, are tubes F, in which are placed the handles of the self adjusting scrapers G. This scraper is kept pressed against the inside of the scoops, as they pass around, by means of a spiral spring H, at the bottom of the tube, attached also to the frame on the inside are two circular guards I, in an upright position, each describing an arc of a little more than a quarter of a circle and are situated within the circle described by the inside of the scoops. These guards may be adjustable to suit the adjustment of the scoops. Between the upper ends of these guards and supported by them is a circular flange J, placed at an angle of about forty-five degrees.

Revolving upon a shaft $k$, attached to the frame and at an angle of about thirty degrees from a perpendicular line is a turntable L. This table may be turned by a pulley and cord or band from one of the driving wheels, or by the friction of the edge of the table upon the inner side of the wheel B². Upon the top of the table is placed an angular scraper M, the inner angle of which rests on the top of the shaft $k$, and the outer end upon a small post N. If preferred, this table may be dispensed with and a permanent inclined plane substituted in its stead.

At the right hand side, as seen in Fig. 3, attached to the frame A, is a gage wheel O, running within an open slot of an upright piece Q. Upon the upper part of this upright piece is cut a screw R, working in a nut S, by means of which the gage wheel can be raised or lowered according as the depth of the ditch may require. Upon the shaft of the wheel B², and attached to it, is a small pulley T, over which runs a cord or band V, from similar pulleys on the driving wheels, by means of which the pentangular wheel is driven.

In the operation of this machine it will be seen that by depressing one end of the scoop the others are thrown out from the line of a true circle and thus placed in a position to scoop up the earth as the wheel revolves and the machine is moved forward. The earth thus scooped up is held within the scoop by the guards I, until it meets with the scraper G, by means of which, in connection with the flange J, it is thrown upon the turntable L, or an inclined plane, and from thence deposited upon the bank of the ditch. After passing once the length of the ditch the scoops are reversed by depressing the opposite ends and fastening as before, turn the screw R, so as to raise the gage wheel equal to the depth that has been cut, place the scraper in the tube on the opposite side of the shaft and hitch the horse to the other end of the machine and go back in the same track and thus continue the operation until the ditch is of the required depth.

What I claim as my invention and desire to secure by Letters Patent, is—

1. The combination of a revolving wheel $B^2$, having its buckets or scoops C, set tangentially, with a stationary circular guard I, and an adjustable scraper G, substantially as and for the purposes set forth.

2. Having the buckets or scoops hung on an axis D, at the center of their length, and adjustable at both ends, substantially as and for the purposes set forth.

3. Providing sharp cutters $a$, projecting at right angles from the center of the scoop, substantially as and for the purposes set forth.

JOHN W. BARCROFT.

Witnesses:
G. YORKE AT LEE,
A. W. ROWELL.